Nov. 10, 1970  A. C. BILLETDEAUX ET AL  3,539,804
FLUID ANALYSIS BY INFRARED ABSORPTION
Original Filed Feb. 24, 1965  4 Sheets-Sheet 1
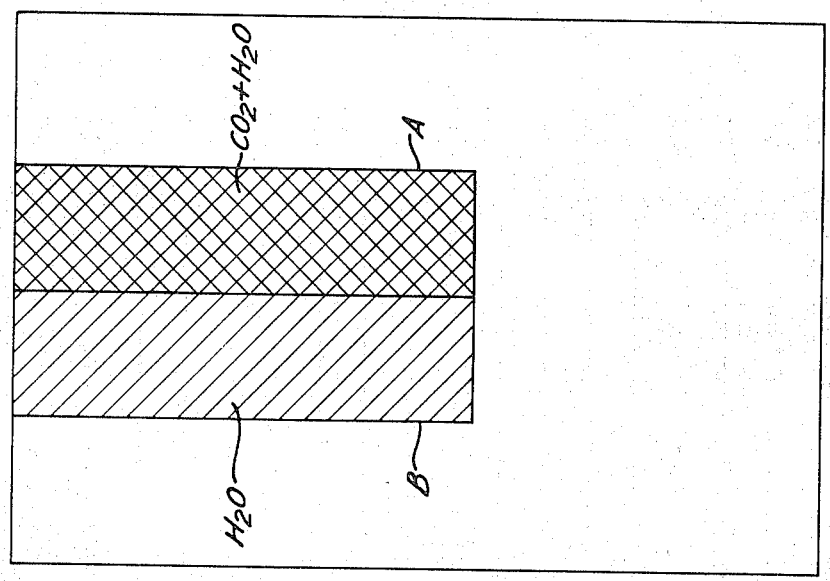
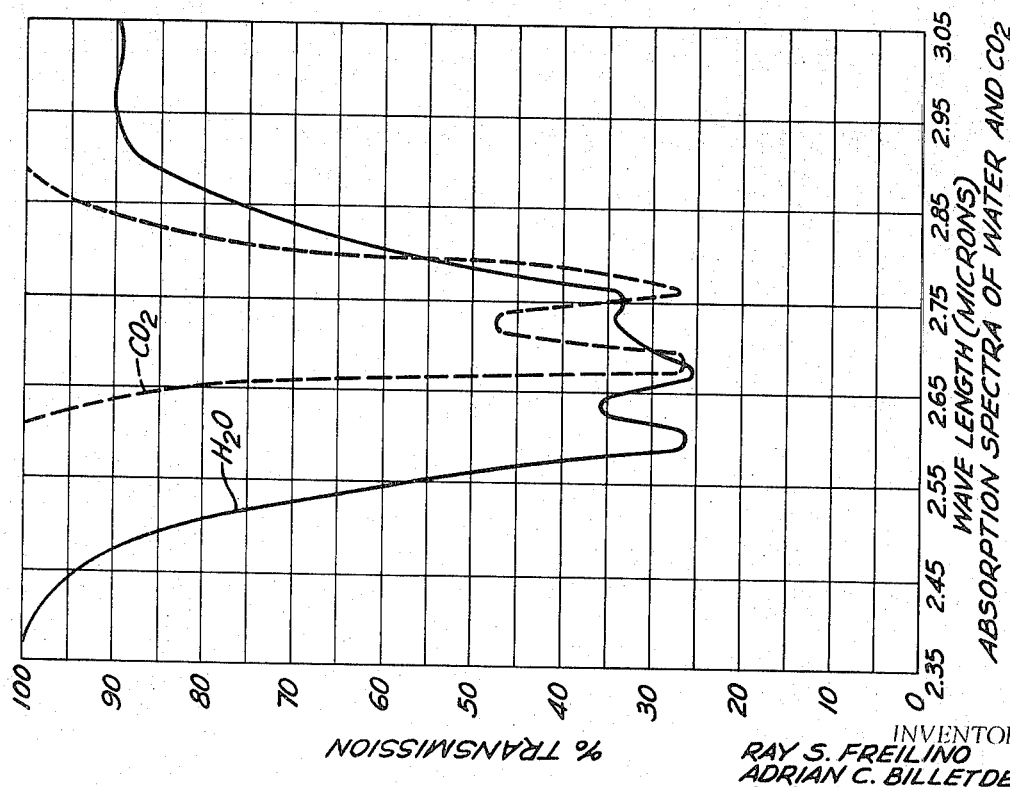
INVENTORS.
RAY S. FREILINO
ADRIAN C. BILLETDEAUX
GLENN H. FERTIG
Brown, Critchlow, Flick & Peckham.
ATTORNEYS.

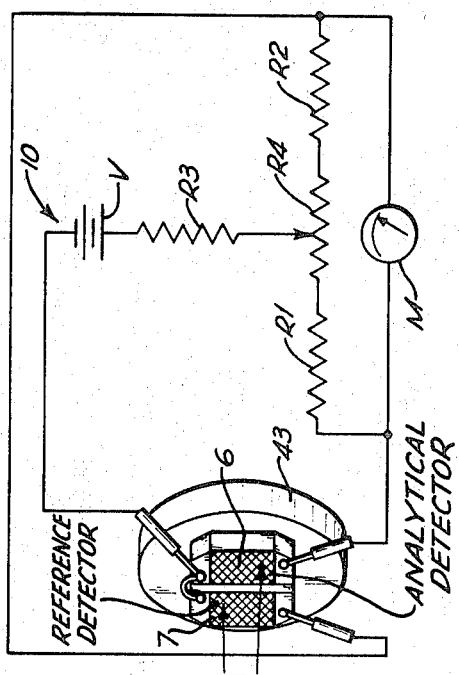
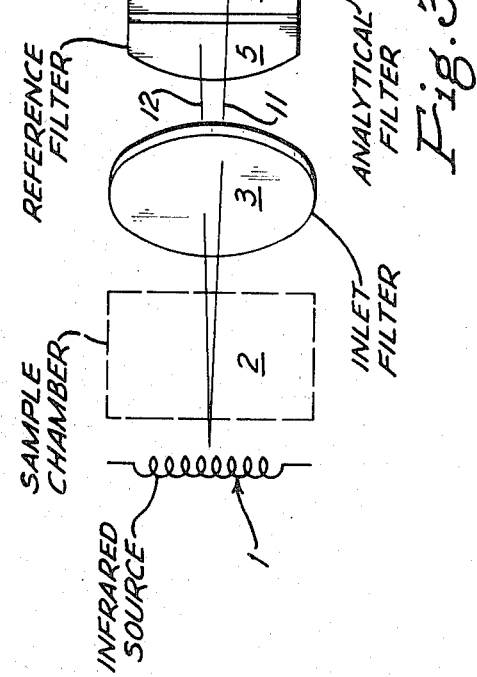
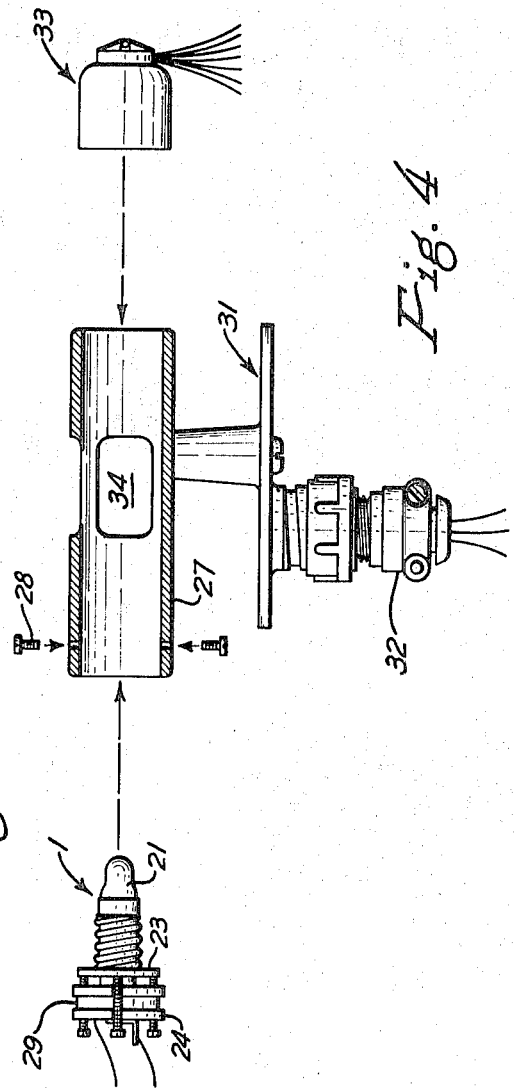

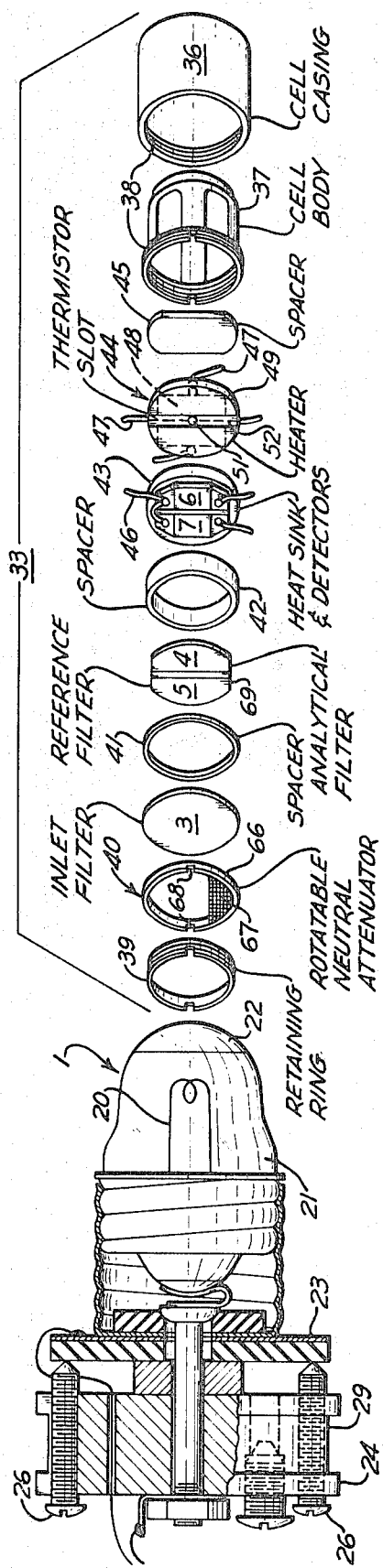
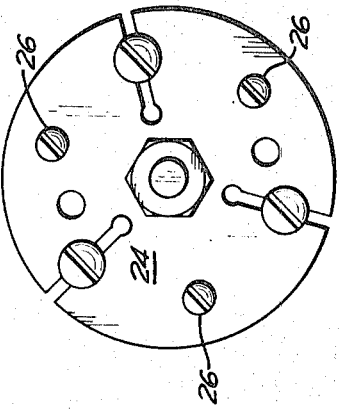

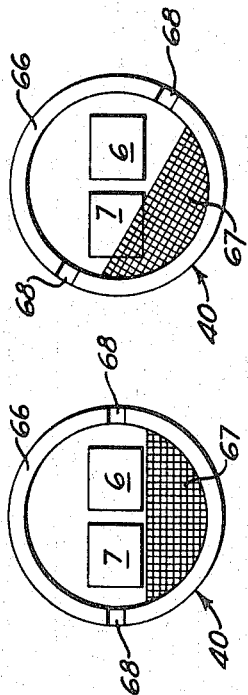
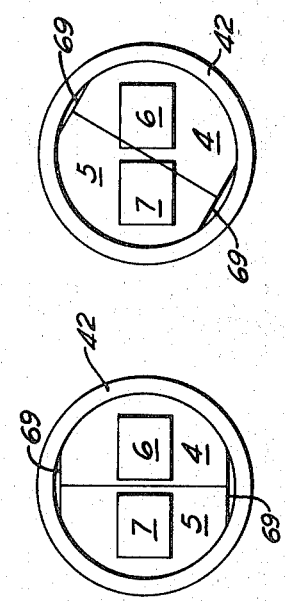
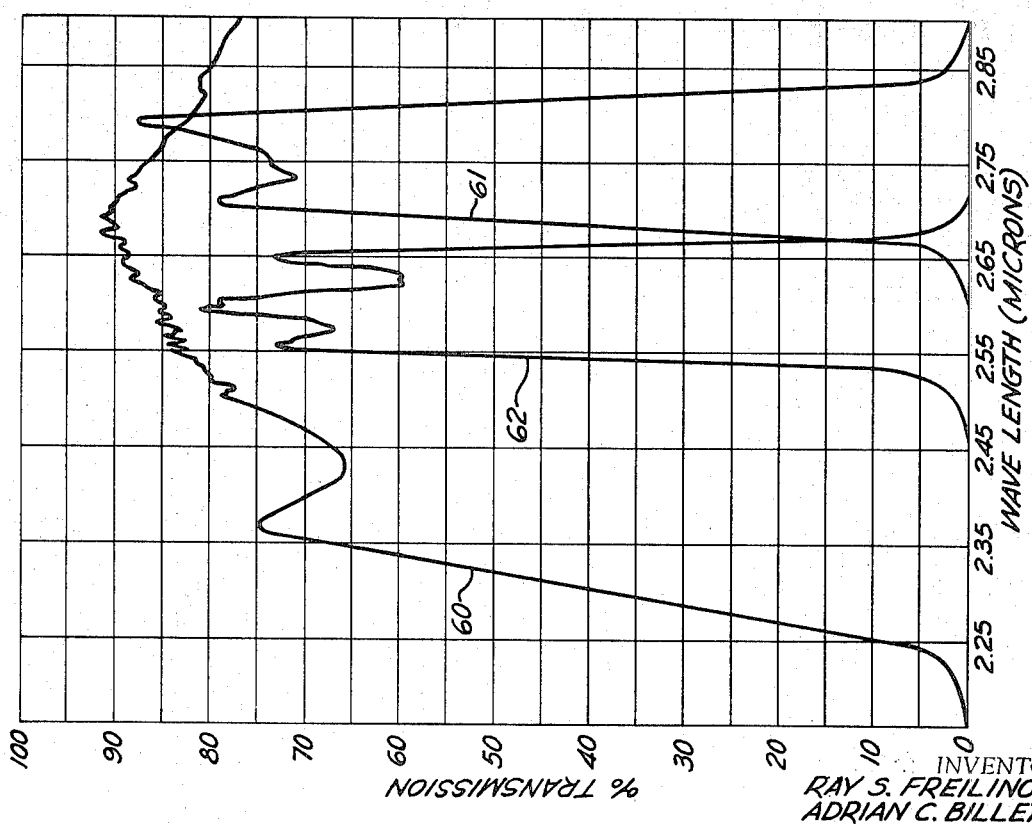

3,539,804
FLUID ANALYSIS BY INFRARED ABSORPTION
Adrian C. Billetdeaux, Pittsburgh, Glenn H. Fertig, Cheswick, and Ray S. Freilino, Pittsburgh, Pa., assignors, by mesne assignments, to the United States of America as represented by the Secretary of the Army
Continuation of application Ser. No. 434,908, Feb. 24, 1965. This application Dec. 23, 1968, Ser. No. 788,682
Int. Cl. G01n 21/26, 21/34
U.S. Cl. 250—43.5     17 Claims This application is a continuation of U.S. patent application Ser. No. 434,908, filed Feb. 24, 1965, now abandoned.

This invention relates to the analysis by infrared absorption of a fluid mixture in which the component to be measured has a defined infrared absorption band that is masked or overlapped by the absorption band of a second component of the mixture and in which the second component also absorbs significant infrared radiation over defined wavelengths outside of but not necessarily adjacent to the absorption band of the component to be measured. More specifically, the invention relates to the determination of the concentration of carbon dioxide in a gaseous mixture, which also contains water vapor, by measuring the infrared absorption of the carbon dioxide in a narrow spectral band that is completely overlapped by a substantially broader absorption band of water vapor. This is done by providing a source of infrared radiation that includes (1) a first band of radiation comprising at least part of the overlapping portions of the absorption bands of the component to be measured and of the second or masking component and (2) a second band of radiation comprising at least part of a non-overlapping portion of the absorption band of the masking component alone. An analytical and a reference filter receive separate beams of radiation emitted from the source. The analytical filter is transparent to at least a part of the first band of radiation but to substantially none of the second band. The reference filter, on the other hand, is transparent to at least part of the second band of radiation but to substantially none of the first band. The mixture to be analyzed is exposed in the optical path of the analytical and reference beams, and radiation responsive means are provided for comparing the radiation transmitted through the mixture and the analytical filter with the radiation transmitted through the mixture and the reference filter.

Although not limited thereto, an important application of the present invention involves the measurement of the concentration of carbon dioxide in the exhalations of a subject whose physiological reactions are being studied, as, for example, for determining the ventilation efficiency of protective respiratory equipment when used continuously over extended periods and under widely varied conditions that simulate conditions under which highly toxic warfare agents may be dispersed in the atmosphere. If an instrument is to be capable of making meaningful measurements that will advance our present knowledge in this field, it must be able to discriminate between variations in $CO_2$ concentration over very short intervals of time that may be less than 1.5 milliseconds, which is equivalent to a frequency response in the instrument of at least 100 cycles per second. A detector having a response on the order of 500 microseconds is suitable. In addition, such an instrument must provide for unimpeded and substantially instantaneous flow of breath through its "sample" chamber, a condition that requires the instrument to be small enough to be worn inside the face mask of the respirator equipment being tested, to avoid lag in sample transport time. Because of these requirements and because of the limited availability of sufficiently sensitive and responsive components, it is desirable, for reasons that need not be detailed here, that a practical measuring instrument make use of the significant and well-defined infrared absorption band of $CO_2$ that has a central wavelength of around 2.72 microns, in preference, for example, to another well-defined wavelength band (centered around a wavelength of 4.2 microns) in which $CO_2$ also shows significant absorption of infrared radiation. An apparent obstacle, however, to use of the $CO_2$ absorption band of shorter wavelength is that it is completely overlapped by the much broader absorption band of water vapor having a central wavelength of around 2.67 microns. Since water vapor in varying amounts up to complete saturation is normally present in breath exhalations, measuring $CO_2$ absorption in an absorption band that is common to both $CO_2$ and water vapor presents the problem of how to compensate for the masking presence of water vapor. To the solution of that problem, among others, this invention is directed.

Other objects will be apparent from the following description of a preferred embodiment of the invention in connection with the attached drawings, in which:

FIG. 1 is a graph of a portion of the infrared spectrum including wavelengths from 2.35 to 3.05 microns, showing two representative absorption bands, one for carbon dioxide and the other for water vapor;

FIG. 2 is an idealized diagrammatic representation of significant portions of the absorption bands of FIG. 1;

FIG. 3 is a diagrammatic view of the instrument of this invention, including an electrical bridge circuit for measuring infrared absorption;

FIG. 4 is an elevation of the assembled optical portion of the instrument;

FIG. 5 is an enlarged exploded view, partly in section, of a portion of the assembly shown in FIG. 4, with the infrared source lamp disproportionately enlarged to make clear details of its structure;

FIG. 6 is an end view of the infrared source that is shown in FIG. 4;

FIG. 7 is a chart showing the wavelength and transmittance characteristics of a suitable set of inlet, analytical, and reference filters;

FIGS. 8a and 8b illustrate diagrammatically the effect of rotating the neutral attenuator, one of the elements shown in FIG. 5; and FIGS. 9a and 9b similarly illustrate the effect of rotating the analytical and reference filters shown in FIG. 5.

The infrared frequencies absorbed by a compound are a function of the type and arrangement of the atoms comprising its molecules. Each molecule may be thought of as a complex vibration system with characteristic resonant frequencies. For most compounds, some of these frequencies fall into the infrared portion of the electromagnetic spectrum. However, homoatomic gases, such as nitrogen, oxygen, and hydrogen, do not absorb infrared radiation and, therefore, do not interfere with its absorption by other compounds. On the other hand, molecules of heteroatomic gases, such as carbon dioxide and water vapor, when exposed to broad band infrared radiation, vibrate at their characteristic resonant frequencies and absorb infrared energy at those frequencies in proportion to the number of molecules present in the absorbing path. Therefore, the percentage of energy absorbed is a measure of the gas concentration.

The analyzer of this invention comprises a source of relatively broad band infrared radiation mounted in front of an inlet window or filter. This filter blocks out much of the unwanted wavelengths from the source, as well as unwanted ambient radiation. The filter is transparent to certain wavelengths, however, including a first wavelength band that comprises at least part of the overlapping portions of the absorption bands of the component to be measured and the masking component, and also including a second wavelength band that comprises at least part of the non-overlapping portion of the absorption band of the masking component alone. Part of the radiation (herein sometimes called the analytical beam) transmitted through the inlet filter is directed through an analytical window or filter to an analytical detector, and another portion (herein sometimes called the reference beam) is directed through a reference window or filter to a reference detector. The analytical filter is transparent to an analytical wavelength band comprising some of the first band but none of the second band of radiation (as defined above) passing through the inlet filter. The reference filter, on the other hand, is transparent to a reference wavelength band comprising at least some of the second band but none of the first band of such radiation. The analytical and reference detectors are each responsive to changes in infrared radiation in the analytical and reference beams, respectively, when the mixture to be analyzed is exposed to radiation in the optical paths described. Preferably, such exposure occurs in a sample chamber between the radiation source and the inlet filter. In a preferred embodiment of the invention, the detectors are connected in an electrical bridge circuit, so that the output of the analytical detector is subtracted from that of the reference detector. The bridge output is then a differential one and is proportional to the amount of energy absorbed in the analytical wavelength band by $CO_2$ present in the sample chamber. If any water vapor is present in the sample chamber, its absorption of infrared radiation is substantially equal in both the analytical and reference bands and therefore produces no differential response in the detectors.

Referring to the drawings, FIG. 1 is a chart of certain infrared absorption bands that are characteristic of $CO_2$ and water vapor in the wavelengths under consideration. The significant portion of the $CO_2$ absorption band lies between the wavelengths of about 2.65 and 2.82 microns and is centered around a wavelength of about 2.72 microns. This $CO_2$ absorption band is completely overlapped by the broader absorption band of water vapor, the significant part of which extends between the wavelengths of 2.51 and 2.87 microns and is centered around a wavelength of about 2.67 microns. An interesting feature of these two absorption bands is (1) that their overlapping significant portions (identified by the cross-hatched area A in the idealized absorption bands shown in FIG. 2) have substantially the same width as the non-overlapping significant portion of the water vapor absorption band alone (identified by the single hatched area B in FIG. 2) and (2) that the absorption by water vapor is substantially equal in both the overlapping and non-overlapping regions.

In its simplest form, shown somewhat diagrammatically in FIG. 3, the instrument of this invention includes a source 1 of infrared radiation, a sample chamber 2, an inlet window or filter 3, an analytical window or filter 4 and a reference window or filter 5, an analytical detector 6 and a reference detector 7. These elements are arranged in partially parallel optical alignment, as shown in FIG. 3, with the analytical and reference filters positioned side by side behind the inlet filter and with the analytical and reference detectors behind their corresponding filters. The detectors are connected in a Wheatstone bridge circuit, generally indicated by the reference numeral 10, for indicating on a suitable meter M any differential in the responses of those detectors.

Infrared radiation from source 1 passes through the mixture in sample chamber 2 and then through inlet filter 3, which blocks out most unwanted portions of the infrared spectrum. Analytical filter 4 and reference filter 5 are each about half the area of the inlet filter, so that a substantially equal portion of radiation passes through the inlet filter to each of the filters 4 and 5. Analytical filter 4 is selected to be transparent to at least a portion of the absorption band that is common to both $CO_2$ and water vapor (zone A in FIG. 2), and the reference filter 5 is selected to be transparent to at least a portion of the adjacent absorption band of water vapor alone (zone B in FIG. 2). Analytical detector 6 measures the radiation, represented by an analytical beam 11, passing successively through the same chamber, the inlet filter, and the analytical filter; and reference detector 7 measures the radiation, represented by a reference beam 12, passing successively through the sample chamber, the inlet filter, and the reference filter. The infrared source 1 and the analytical and reference filters 5 and 6 are so chosen and positioned that, when the mixture in the sample chamber consists of either a homoatomic gas or gases alone, which do not absorb infrared radiation, substantially equal amounts of radiant energy will reach each detector 6 and 7, and there will be no difference in the responses of those detectors. If water vapor is also present in the sample chamber, it will absorb some of the infrared energy, but it will absorb equal amounts in the wavelength bands passing through the analytical and reference filters so that there will again be no difference in the responses of the detectors. When $CO_2$ is present in the sample chamber, however, the $CO_2$ will absorb infrared energy in those wavelengths that pass through the analytical filter, but not in those wavelengths that pass through the reference filter, so that less radiation will reach analytical detector 6 than will reach reference detector 7. Bridge circuit 10 will thereby be unbalanced, and the amount of the unbalance will be proportional to the concentration of $CO_2$ in the sample chamber.

Certain components of this invention are shown in more detail in FIGS. 4-6. The infrared radiation source 1 is an electrically heated filament 20 of a conventional glass lamp bulb 21 having a lens 22 at its end. Although the wavelengths emitted by the filament cover a broad band, those wavelengths longer than about 3.5 microns are largely blocked by the glass portion of the bulb. Lamp 21 is screwed in a lamp holder 23, which is adjustably mounted on a base 24 by means of three screws 26 that permit the lamp holder to be tipped slightly in any direction relative to the optical axis of the instrument. This permits the infrared source to be positioned to produce equal detector outputs in the absence of $CO_2$ in the sample chamber. The lamp assembly is mounted at one end of a tube or housing 27, being held therein by screws 28 that engage an annular groove 29 extending around the base 24. Housing 27 is mounted on a base member 31, which is adapted to be secured to the inside of a breathing mask (not shown) adjacent the wearer's mouth. Base member 31 is provided with a plug connector 32 for making various electrical connections outside the mask, including connections between the lamp filament and a current source (not shown) and between detectors 6 and 7 and other remote portions of the bridge circuit (see FIG. 3).

A detector cell assembly 33 is mounted in the other end of the housing 27, with about one inch separating the detector and lamp assemblies. This space represents the sample chamber 2; and, as shown in FIG. 4, the housing around this space is provided with openings 34 to permit exhaled breath to pass readily through the sample chamber when the instrument is worn inside a breathing mask. The detector cell assembly includes a cell casing 36, preferably made of a material, such as plastic, having poor thermal conductivity. A cell body 37 fits inside the casing and is secured thereto by screw threads 38. Packed inside the cell body and secured therein by a threaded retaining ring 39 are the following elements shown in the exploded view of FIG. 5: a rotatably adjustable neutral attenuator 40, inlet filter 3, a spacer 41, analytical and reference filters 4 and 5, a spacer element 42 rotatably supporting filters 4 and 5, radiation detectors 6 and 7, an aluminum heat sink 43 on which the detector elements are mounted, a heater element 44 and a spacer 45. The foregoing elements, when assembled in the cell body and then in the cell casing, provide a very compact and substantially sealed unit of less than one inch in length. Electrical leads 46 and 47 extend from the detectors and heater, respectively, through the end of the casing.

Detectors 6 and 7 are lead sulfide photo-resistors, which are commercially available in various sizes and geometries and have excellent sensitivity and frequency responses. Each detector element is in the form of a thinlayer of lead sulfide, these layers being mounted side by side on a common substrate that has a coefficient of expansion similar to that of the aluminum heat sink 43. The impedence levels of the detectors are sufficiently low that they may be located remotely from other elements of the bridge circuit 10, so long as adequate shielding is provided. Because the response of the detectors varies significantly with temperature, their temperature must be controlled within very narrow limits. This can be most conveniently done by maintaining the detectors at a temperature slightly higher than the highest ambient temperature to which they are likely to be subjected in use, which for the use here contemplated in breathing apparatus need be only slightly above body temperature. To maintain a uniform temperature, the detectors are mounted on the aluminum heat sink 43, which is in contact with heater element 44. The heater element may conveniently be in form of an electrical resistance 48 mounted on a ceramic substrate 49, preferably on that side of the heater element remote from the heat sink. For sensing minute temperature changes, a thermistor 51 is mounted in a slot 52 on the other side of the heater element. A suitable thermistor for this purpose is a Veco 35A5, which has a nominal room temperature resistance of around 5000 ohms and a sensitivity of approximately 500 ohms/° C. When the resistance 48 of the heater element is connected to a current source (not shown) through a conventional control circuit (also not shown) that includes thermistor 51, the temperature of the detectors may be held within very small limits. It will be noted that the detecor elements are shielded from ambient convection currents by other components of the detector cell assembly and that pulses of heat generated in the heater in response to the thermistor control are largely damped out by the heat sink and do not cause undesirable fluctuations in the temperatures of the detectors themselves. In addition, the heat sink keeps the temperature gradients beween the two detectors at a minimal value.

Inlet filter 3 and analytical and reference filters 4 and 5 are bandpass interference filters made to the desired specifications. Such filters are well known and consist of an infrared-transmitting substrate overlayed with layers of materials of varying refractive index, so that all but the wanted wavelengths interfere and are reflected. Because of practical considerations, specifications for interference filters having the desired characteristics are based on the macroscopic character of the absorption band in question and not on its actual, detailed, fine line characteristics. It is important, however, that the wavelength width of each filter be large enough that fine line absorption variation between the two portions of the water vapor absorption band (i.e., the separate portions passing through each of the analytical and reference filters) may average out or compensate each other. On the other hand, the bandpass width should not be so great that excess fringe radiation is transmitted; otherwise, the sensitivity of the instrument would be reduced. In addiion, there should be minimal overlap of the wavelengths passing through the analytical and reference filters. In accordance with these considerations, the characteristics of suitable bandpass interference filters for use as inlet, analytical, and reference filters are shown in FIG. 7 by the wavelength-transmittance curves 60, 61, and 62, respectively. The transmittance (curve 60) of the inlet window is not shown beyond 2.89 microns, because its upper cut-off limit is relatively unimportant in view of the fact that the lead sulfide detectors do not respond significantly to wavelengths over 3 microns. In order to assure proper registration of the analytical and reference filters with respect to the pertinent water vapor and carbon dioxide absorption bands (see FIG. 2), the central wavelength chosen for the analytical filter is 2.760 microns, and for the reference filter, 2.579 microns; and each of these filters has a passband width of about .125 micron at 30 percent transmission.

The bridge circuit, in which detectors 6 and 7 form two of the arms, also includes precision resistors R1 and R2, which form the other two arms. Power to the bridge is provided by a battery V or other direct current source. A fixed resistor R3 in series with the battery limits the detector current to a safe value. Initial bridge balance is provided by a potentiometer R4, in the form of a variable resistor between the two fixed bridge resistors R1 and R2. In this bridge circuit, the output of the analytical detector 6 is subtracted from the output of the reference detector 7. When either $CO_2$ nor water vapor is present in the analytical and reference beams, the output of those detectors should be equal. Proper zeroing of the instrument under these conditions is obtained in the first instance by adjusting the position of the infrared source 1 by means of adjusting screws 26, as previously described, so as to obtain nearly zero output from the bridge circuit; and final zeroing may be obtained by adjusting potentiometer R4 in the bridge circuit.

Alternatively, the zeroing of the instrument can be effected by adjusting the rotatable neutral attenuator 40, which is positioned in front of the inlet filter, as shown in FIG. 5. This attenuator is in the form of a thin ring 66, across the lower portion of which is a screen 67 of, for example, wire mesh. The attenuator is normally in the position shown in FIG. 8a, in which the screen element does not occlude any of the radiant energy passing from source 1 to detectors 6 and 7. However, by rotating the ring 66 (for example, by means of the spanner slots 68) as shown in FIG. 8b, the position of the screen can be adjusted to attenuate more or less the radiant energy reaching one of the detector elements. Such attenuation reduces the response of the affected detector and thereby serves to zero the bridge circuit wholly or partially. This zeroing means is particularly helpful when the outputs of detector elements 6 and 7 are not matched, as they preferably should be, within at least 10 percent. The zeroing effect of the attenuator will vary with the transparency of the screen material, a more open (coarse) screen providing less attenuation and therefore finer adjustment, and a less open (fine) screen, or even an opaque element in place of the screen, providing coarser adjustment. Ordinarily, this type of adjustment is made during the assembly and testing of the instrument and need not be altered after final assembly. However, if desired, provision can be easily made to permit adjustment of the attenuator in the field by, for example, providing ring 66 with an arm extending radially through a slot in the cell casing 36.

As previously indicated, analytical filter 4 and reference filter 5 may be rotatably mounted in spacer 42. Normally, the filters would be positioned relative to the detector elements immediately behind them as shown in FIG. 9a, in which analytical detector 6 receives radiation only through analytical filter 4 and reference detector 7 receives radiation only through reference filter 5. However, by rotating these two filters (for example, by means of a suitable tool spanning the flats 69) relative to the detector elements as shown in FIG. 9b, it is possible to modify the incidence of such radiation, so that some of the radiation passing through the analytical and reference filters will be transmitted to the reference detectors and analytical detectors, respectively. Such modification is useful, for example, to adjust the span, or full scale sensitivity, of the instrument. This adjustment will generally be made only before final assembly, but it could be done in the field also by the means suggested above for adjusting attenuator 40.

If the gas in sample chamber 2 has a $CO_2$ concentration of 10 percent and if the sample chamber is about one inch long, it has been found that about 6 percent of the infrared radiation in the analytical beam will be absorbed by the $CO_2$. If the output of each detector is assumed to be unity in the absence of both $CO_2$ and water vapor, then a $CO_2$ concentration of 10 percent (without water vapor) will decrease the output of the analytical detector to 0.94 and the differential between the two detector outputs will be 1 minus 0.94, or 0.06. If the same gas mixture is, in addition, saturated with water vapor (amounting to approximately 6.2% of $H_2O$ at 98.6° F.), the radiation in both the analytical and reference beams will be equally attenuated by about 3.6 percent, so that the output of each detector will be reduced by water vapor absorption to 0.964 and the output of the analytical detector will be further reduced by $CO_2$ absorption to 0.964 minus the product of 0.06 times 0.964, or to 0.9062; and the differential between the two detector outputs will be 0.964 minus 0.9062, or 0.0578. In other words, the absorption effect of the maximum concentration of water vapor in the exhaled breath will reduce the output by only 3.6 percent. It should be noted that this error occurs as a percentage of the meter reading rather than as a percentage of the full meter scale, so that the absolute value of the error decreases as the $CO_2$ concentration decreases. For example, when there is no $CO_2$ in the sample chamber, the indicated response to water vapor is zero.

The instrument of this invention is particularly suitable for dynamic monitoring of $CO_2$ levels in the breathing of experimental subjects wearing protective breathing masks. The instrument has the necessary miniaturization, both in dimension and weight, to fit inside current breathing masks such as the M–17. The basic sensor assembly in housing 27 shown in FIG. 4 measures approximately $2^{11}/_{16}$ inches in length and about $1^{3}/_{16}$ inch in diameter, and it weighs approximately 4.5 ounces. The bridge and heating circuits and power supply outside the mask may either be carried by the wearer or placed on a convenient support near him. The solid state detector elements are substantially nonmicrophonic and with low noise cables connecting the sensor to the other circuit elements, noise is at a minimum. The power consumption is about 1.4 watts. In addition, the sensor is extremely rugged and will not be damaged from normal handling. The instrument itself is insensitive to the sample flow rates encountered in breathing, and the response time of the sensor is limited only by the fundamental dector time constant, nominally 500 microseconds. The period of maximum breathing frequencies is well above this level, so that frequency response is more than ample.

It will be understood, of course, that the inlet filter 3 could be dispensed with, if the radiation source 1 were of a type that emitted only a relatively narrow band of infrared radiation, such as that transmitted by the inlet filter, or alternatively, if analytical and reference filters 4 and 5 could be obtained that would operate effectively under conditions of broad spectrum incident radiation.

It will likewise be understood that instead of comparing the responses of the analytical and reference detectors 6 and 7 by measuring their differences, those responses can be compared in other ways, as, for example, by measuring their ratio, or by the amount of adjustment of a circuit parameter needed to reduce to zero the difference between the responses of the two detectors. Still other suitable methods of comparison can be improvised by those skilled in the art.

In the instrument described herein, comparison is made between the outputs of two detector elements when exposed separately but simultaneously to analytical and reference beams, respectively. It will be apparent that an equivalent comparison can be made between the successive responses of a single detector element that is exposed alternately to the analytical and reference beams. In the former case, the outputs of the two detectors are separated in space, but not in time; in the latter case, the successive outputs of the same detector are separated in time, but not in space. This latter result can be obtained by simple modification of the device illustrated herein; as, for example, by using only the analytical detector element 6 and subjecting it alternately to analytical and reference beams by moving the analytical and reference filters so that they successively and alternately interrupt a single optical beam from the infrared source 1 to detector 6. Any difference in the successive outputs of that detector will be manifested by a single output varying in time, which can be amplified, measured, and compared by well known conventional means. Generally, the system described in detail herein provides a very fast response, because of its direct coupled detector output system, and requires only a minimum of space for its operation. The alternative system referred to in this paragraph is, however, entirely suitable for many applications, and its response speed is increased by increasing the frequency of the alternations of analytical and reference beams delivered to the single detector element.

According to the provisions of the patent statutes, we have explained the principle of our invention and have illustrated and described what we now consider to represent its best embodiment. However, we desire to have it understood, that, within the scope of the appended claims, the invention may be practiced otherwise than as specifically illustrated and described.

We claim:

1. An infrared absorption analyzer for measuring one component of a fluid mixture where that component has a defined infrared absorption band that is substantially overlapped by the absorption band of a masking component of the mixture and where the masking component also has a defined infrared absorption band that is outside of the absorption band of the component to be measured, said analyzer comprising a source of infrared radiation that includes a first band of infrared radiation comprising at least part of the overlapping portions of the absorption bands of the component to be measured and of the masking component and also includes a second band of infrared radiation comprising at least part of a non-overlapping portion of the absorption band of the masking component alone, an analytical filter and a reference filter for receiving separately beams of radiation emitted from the source, the analytical filter being transparent to at least a part of said first band but to substantially none of said second band of radiation and the reference filter being transparent to at least a part of said second band but to substantially none of said first band of radiation, means for exposing the mixture to be analyzed in the optical path of said radiation beams, and radiation responsive means for receiving and measuring both the radiation transmitted through the mixture and the analytical filter and the radiation transmitted through the mixture and the reference filter; said radiation responsive means being lead sulfide photo resistors mounted on an aluminum heat sink, said heat sink being in contact with a heater means to maintain uniform temperature of the radiation responsive means, said heater means being an electrical resistance element mounted on a ceramic substrate.

2. An infrared absorption analyzer for measuring one component of a fluid mixture where that component has a defined infrared absorption band that is substantially overlapped by the absorption band of a masking component of the mixture and where the masking component also has a defined infrared absorption band outside of the absorption band of the component to be measured, said analyzer comprising means for producing a relatively narrow band of infrared radiation that includes a first band comprising at least part of the overlapping portions of the absorption bands of the component to be measured and of the masking component and also includes a second band comprising at least part of a non-overlapping portion of the absorption band of the masking component alone, an analytical filter and a reference filter for receiving separate beams of such radiation, the analytical filter being transparent to at least a part of said first band but to substantially none of said second band of radiation and the reference filter being transparent to at least a part of said second band but to substantially none of said first band of radiation, means for exposing the mixture to be analyzed in the optical path of said radiation beams, separate analytical and reference radiation responsive detectors for receiving infrared radiation transmitted through the mixture and through the analytical and reference filters, respectively; said radiation responsive detectors being lead sulfide photo resistors mounted on an aluminum heat sink, said heat sink being in contact with a heater means to maintain uniform temperature of the radiation responsive detectors, said heater means being an electrical resistance element mounted on a ceramic substrate, and means connected to the detectors for measuring their responses to such radiation.

3. An infrared absorption analyzer for measuring one component of a fluid mixture where that component has a defined infrared absorption band that is substantially overlapped by the absorption band of a masking component of the mixture and where the masking component also has a defined infrared absorption band that is outside of the absorption band of the component to be measured, said analyzer comprising in optical alignment a source of infrared radiation, an inlet filter transparent to a relatively narrow band of infrared radiation that includes a first band comprising at least part of the overlapping portions of the absorption bands of the component to be measured and of the masking component and also includes a second band comprising at least part of a non-overlapping portion of the absorption band of the masking component alone, an analytical filter and a reference filter for receiving separate beams of radiation transmitted by the inlet filter, the analytical filter being transparent to at least a part of said first band but to substantially none of said second band of radiation and the reference filter being transparent to at least a part of said second band but to substantially none of said first band of radiation, chamber means for exposing the mixture to be analyzed in the optical path of said radiation beams, separate analytical and reference radiation responsive detectors for receiving the infrared radiation transmitted through the mixture and through the analytical and reference filters, respectively, said radiation responsive detectors being lead sulfide photo resistors mounted on an aluminum heat sink, said heat sink being in contact with a heater means to maintain uniform temperature of the radiation responsive detectors, said heater means being an electrical resistance element mounted on a ceramic substrate, and means connected to the detectors for measuring their responses to such radiation, said chamber means being located between the radiation source and the detectors.

4. Apparatus according to claim 3, in which the fluid mixture component to be measured is carbon dioxide and the masking component is water vapor and in which the radiation passing through the analytical filter has a central wavelength between 2.67 and 2.85 microns, and that passing through the reference filter a central wavelength between 2.49 and 2.67 microns.

5. Apparatus according to claim 4, in which the central wavelength passing through the analytical filter is about 2.76 microns and that passing through the reference filter about 2.58 microns.

6. Apparatus according to claim 3, in which the analytical and reference detectors are in the form of lead sulfide films mounted on a substrate.

7. Apparatus according to claim 3, in which the analytical and reference filters are positioned side by side and are rotatable as a unit about the optical axis of the instrument relative to the analytical and reference detectors, said filters in their normal position transmitting radiation only to their corresponding detectors but in adjustable rotated positions permitting some radiation transmitted by both filters to reach at least one of the detectors.

8. Apparatus according to claim 3, that also includes attenuating means of infrared radiation occluding material mounted for interposition in the optical path between the radiation source and one of the detectors for attenuating the radiation reaching that detector.

9. Apparatus according to claim 3, in which attenuating means in the form of a screen mesh are rotatably mounted adjacent the optical axis of the instrument and normally positioned out of the optical path between the radiation source and either of the detectors but adjustably rotatable to permit interposition of the screen material in said optical path, for zeroing the instrument.

10. Apparatus according to claim 3, in which the inlet, reference and analytical filters and the detectors are mounted in a cell that supports them in optical alignment with the source of radiation.

11. Apparatus according to claim 10, in which the analytical and reference filters are mounted side by side in a plane transverse to the optical axis of the equipment.

12. Apparatus according to claim 3, in which the means for exposing the fluid mixture in the optical paths of said radiation include a sample chamber between the radiation source and the inlet filter, with the openings in the chamber for passage of the mixture therethrough.

13. Apparatus according to claim 3, in which the means for measuring the responses of the detectors to radiation reaching them includes a Wheatstone bridge circuit, in which the detectors are components so connected that the unbalance of the bridge circuit will be proportional to the difference between the responses of the detectors.

14. The method of determining by infrared absorption the concentration of the heteratomic primary component of a fluid sample that also includes a heteratomic masking component where the primary component has a defined infrared absorption band that is substantially overlapped by the absorption band of the masking component and where the masking component also has a defined infrared absorption band that is outside of the absorption band of the primary component, said method including the following steps: passing two beams of infrared radiation from a source of radiation through the sample, each beam including a first radiation band comprising part of the overlapping portions of the absorption bands of the primary and masking components and also including a second radiation band comprising part of the non-overlapping portion of the absorption band of the masking component alone; passing one beam through an analytical filter that is transparent to a part of said first band but to substantially none of said second band of radiation; passing the other beam through a reference filter that is transparent to a part of said second band but to substantially none of said first band of radiation; receiving the beams from the analytical filter and the reference filter by a radiation responsive lead sulfide photo resistor mounted on an aluminum heat sink, said heat sink being in contact with a heater means to maintain uniform temperature of the radiation responsive resistor; passing an electric current through an electrical resistance element to generate heat; generating heat to maintain a constant temperature of the responsive resistor; maintaining a constant temperature of the responsive resistor; and comparing the overall radiant energies of the two beams after their passage through the sample and filters.

15. The method of determining by infrared absorption the concentrtion of a heteratomic primary component of a fluid sample that also includes a heteratomic masking component where the primary component has a defined absorption band that is substantially overlapped by the absorption band of the masking component and where the masking component also has a defined infrared absorption band that is outside of the absorption band of the primary component, said method including the following steps: passing through the sample an analytical beam of infrared radiation and substantially limiting the band width of that beam to the overlapping portion of tht absorption bands of the primary and masking components; passing through the sample a reference beam of infrared radiation and substantially limiting the band width of that beam to the non-overlapping portion of the absorption band of the masking component alone; adjusting the intensities and band widths of both beams so that the measured difference between the radiant energies of the two beams after passage through the sample is substantially unaffected by the presence of the masking component in the sample; and determining the concentration of the primary component in the sample by measuring and comparing the radiant energies of the two beams after passage through the sample, the comparing being accomplished by a radiation responsive lead sulfide photo resistor mounted on an aluminum heat sink, said heat sink being in contact with a heater means to maintain uniform temperature of the radiation responsive resistor; passing an electric current through an electrical resistance element to generate heat; generating heat to maintain a constant temperature of the responsive resistor; and maintaining a constant temperature of the responsive resistor.

16. The method of determining by infrared absorption the concentration of a heteratomic primary component of a fluid sample that also includes a heteratomic masking component where the primary component has a defined infrared absorption band that is substantially overlapped by the absorption band of the masking component and where the masking component also has a defined infrared absorption band that is outside of the absorption band of the primary component, said method including the following steps: passing two separate beams of infrared radiation simultaneously from a source to a pair of radiation responsive detectors; interposing the fluid sample between the source and each of the detectors; substantially limiting the band width of the radiation passing to one detector to the overlapping portion of the absorption bands of the primary and masking components; substantially limiting the band width of the radiation passing to the other detector to the non-overlapping portion of the absorption band of the masking component alone; varying the intensities and band widths of both radiation beams so that the difference in the response of the two detectors is substantially unaffected by the presence and absence of the masking component in the sample; and determining the concentration of the primary component in the sample by comparing the responses of the two detectors, the comparing being accomplished by a radiation responsive lead sulfide photo resistor mounted on an aluminum heat sink, said heat sink being in contact with a heater means to maintain uniform temperature of the radiation responsive resistor; passing an electric current through an electrical resistance element to generate heat; generating heat to maintain a constant temperature of the responsive resistor; and maintaining a constant temperature of the responsive resistor.

17. The method of determining by infrared absorption the concentration of carbon dioxide in a gaseous mixture that also includes water vapor, where the carbon dioxide has a defined infrared absorption band centered around a wavelength of about 2.72 microns that is substantially overlapped by a defined infrared absorption band of water vapor centered around a wavelength of about 2.67 microns, said method including the following steps: separately passing two beams of infrared radiation from a source to radiation responsive detector means; interposing the fluid sample between the source and the detector means; substantially limiting the band width of one beam to a part of the overlapping portions of said absorption bands of carbon dioxide and water vapor; substantially limiting the band width of the other beam to a part of the non-overlapping portion of the absorption band of water vapor alone; adjusting the intensities and band widths of both beams so that the difference between the radiant energies of the two beams as separately measured by the detector means is substantially unaffected by the presence of water vapor in the sample; and determining the concentration of carbon dioxide in the sample by comparing the radiant energies of the two beams as measured by separate responses of the detector means, the comparing being accomplished by a radiation responsive lead sulfide photo resistor mounted on an aluminum heat sink, said heat sink being in contact with a heater means to maintain uniform temperature of the radiation responsive resistor; passing an electric current through an electrical resistance element to generate heat; generating heat to maintain a constant temperature of the responsive resistor; and maintaining a constant temperature of the responsive resistor.

References Cited

UNITED STATES PATENTS

| | | |
|---|---|---|
| 2,703,844 | 3/1955 | Miller. |
| 2,756,342 | 7/1956 | Miller. |
| 2,775,160 | 12/1956 | Foskett et al. |
| 2,933,600 | 4/1960 | Spracklen et al. |
| 3,121,790 | 2/1964 | Munday et al. |
| 3,255,632 | 6/1966 | Brooks et al. _____ 250—83.3 X |

WILLIAM F. LINDQUIST, Primary Examiner

U.S. Cl. X.R.

250—83.3